United States Patent

Honda

[15] 3,690,429

[45] Sept. 12, 1972

[54] CLUTCH WITH DUAL PISTONS AND SPRINGS

[72] Inventor: Soichiro Honda, Tokyo, Japan

[73] Assignee: Honda Giken Kogyo Kabushiki Kaisha, Tokyo, Japan

[22] Filed: July 15, 1971

[21] Appl. No.: 162,798

Related U.S. Application Data

[62] Division of Ser. No. 825,181, May 16, 1969, Pat. No. 3,612,237.

[52] U.S. Cl. ........................... 192/85 AA, 192/113 B
[51] Int. Cl. ............................................. F16d 25/00
[58] Field of Search ...... 192/85, 85 A, 85 AA, 109 F, 192/87.17

[56] References Cited

UNITED STATES PATENTS 3,384,214  5/1968  Wilson ................... 192/109 F

*Primary Examiner*—Benjamin W. Wyche
*Attorney*—Eric H. Waters et al.

[57] ABSTRACT

A fluid pressure-operated friction clutch is provided with a piston operating within a pressure chamber and constituted by two piston members having respective return springs of different strengths so that the pressure chamber can be opened to the atmosphere through a small escape passageway by the advance movement of one piston member whereafter the passageway is closed by the relative movement of the other piston member, whereby the piston which is coupled to frictional clutch plates applies a weak initial force to engage the plates without shock and a subsequent strong force to fully engage the clutch plates.

3 Claims, 4 Drawing Figures

PATENTED SEP 12 1972   3,690,429

CLUTCH WITH DUAL PISTONS AND SPRINGS

This application is a division of my earlier application, Ser. No. 825,181, filed May 16, 1969, now U.S. Pat. No. 3,612,237, claiming the priority of my application filed in Japan on May 16, 1968.

BRIEF SUMMARY OF THE INVENTION

This invention relates to a friction clutch operated by a fluid pressure, and particularly to a clutch which can be engaged without shock and operated reliably.

In accordance with the invention, there is provided a friction clutch which comprises a casing having a chamber in which a slidable piston is received, means for the supply of a pressure fluid to the chamber to displace the piston therein, a plurality of frictional clutch plates having an engaged operative condition and a disengaged inoperative condition, means coupling the piston and the clutch plates to operate the latter in accordance with displacement of the piston in said chamber, said piston including first and second members undergoing relative displacement by the pressure of the fluid in the chamber and means controlled by the relative displacement of said first and second members to discharge part of the pressure fluid supplied to the chamber to produce a regulated slow rise in pressure during which the clutch plates are slowly engaged, whereafter the discharge is terminated and the pressure rises rapidly and the clutch plates are forceably engaged and rendered operative.

The means which is controlled by the relative displacement of the first and second members of the piston is constituted by a passageway in one of said first and second members which is selectively blocked by the other of said members.

In further accordance with the invention, the clutch comprises means which provides for unequal displacement of the first and second members of the piston by the pressure of the fluid in the chamber, such means being constituted by first and second springs acting on the respective members and having different strengths. The inequality of displacement of the first and second members of the piston is reversed after the passageway is unblocked by arresting the advanced piston member, whereupon the passage is again blocked and the pressure rises rapidly in the chamber and the clutch plates are forceably engaged.

According to an embodiment of the invention, the passageway is formed in the piston member which undergoes advance displacement, said passageway being blocked by the other piston member until the advancing piston member has undergone relative displacement to communicate the passageway with the atmosphere, said passageway subsequently becoming blocked again when the retarded piston member advances relative to the first piston member when the latter abuts the clutch plates.

DETAILED DESCRIPTION

Figure 1:
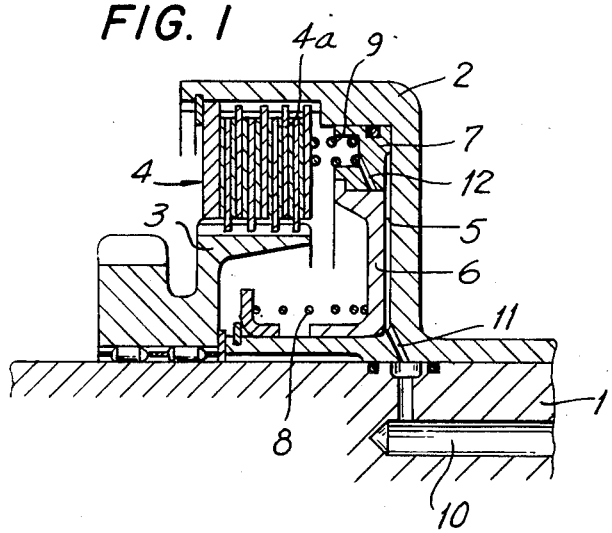
FIG. 1 is a sectional side view of one embodiment of the invention.

In FIG. 1 of the drawing there is shown a driving shaft 1 provided with a driving casing 2, which is in splined engagement with said shaft 1 for rotating therewith, a driven wheel 3 being driven in rotation by said casing 2 through a frictional clutch 4. A pressure chamber 5 of the driving casing 2 is provided with a piston comprising two divided inner and outer piston members 6 and 7 positioned opposite a group of friction plates 4a of the clutch 4. The frictional plates 4a have a disengaged, inoperative position and an engaged operative position in which the plates are pressed together. A return spring 9 acts on the outer piston 7 and is constructed to be stronger than a return spring 8 acting on the inner piston 6. The return spring 9 is so designed that the same does not apply pressure to the friction plates 4a in its relaxed condition. The pressure chamber 5 behind the pistons 6 and 7 is in communication through a communicating opening 11 with a liquid pressure chamber 10 in the driving shaft 1, and the outer piston 7 is provided with a small escape opening or passageway 12 for communicating the pressure chamber 5 with the ambient atmosphere, the escape opening 12 being closed to pressure chamber 5 by the inner piston 6 in the condition shown in FIG. 1 wherein no pressure fluid is supplied to the pressure chamber 5.

Figure 2:
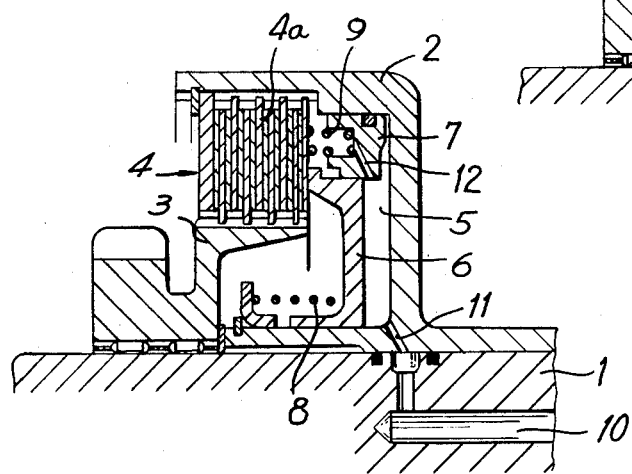
FIG. 2 is a sectional side view of the embodiment in operating condition.

When the inner piston 6 is moved against the action of weak return spring 8 in the initial stage of fluid pressure supply to chamber 5, the escape opening 12 is opened as shown in FIG. 2 for discharging part of the pressure fluid to lower the rise in pressure. The piston 6 then meets a resistance which is greater than the strength of spring 9, said resistance being a fixed abutment or preferably the friction plates 4a as shown in FIG. 2. Then the outer piston 7 is subsequently advanced and the escape opening 12 is again closed. The springs 8 and 9 thus constitute a means for delaying the advance of one of the piston members with respect to the other.

The operation of the apparatus is as follows:

If a pressure fluid is continuously supplied to the interior of the pressure chamber 5 in the condition shown in FIG. 1, the pressure within the pressure chamber 5 initially rises and the outer piston 7 slightly advances, thereby applying slight pressure to the friction plates 4a through the spring 9. Simultaneously, however, the inner piston 6 also is displaced, and due to the lower opposition of spring 8, piston 6 advances to open the escape opening 12, so that the fluid flowing into the pressure chamber 5 is partly discharged, whereby the rate of pressure rise within the chamber 5 is reduced. The piston 6 then contacts friction plates 4a. Up to this point, the increase of the pushing force against the friction plates 4a by the piston 7 is at a comparatively low rate. The outer piston 7 then further advances relative to piston 6 by the continuing pressure rise within the chamber 5 so as to eventually close the escape opening 12, whereupon the rate of pressure rise within the pressure chamber 5 becomes rapid, and the force applied against the friction plates 4a by both pistons 6 and 7 is great and the clutch plates 4a are pressed together in fully engaged condition. It is not necessary for the piston 6 to contact the friction plates 4a and it may contact a fixed abutment, in which case the force applied to the friction plates 4a will be achieved solely by piston 7. With either arrangement, the friction plates 4a are initially activated by a relatively low force which gradually builds up until passage 12 is closed, whereupon the plates 4a are rapidly and forcibly pressed together. Thereby, initial engagement of the clutch is smooth and without shock, and complete, forceable engagement follows subsequently.

Figure 3:
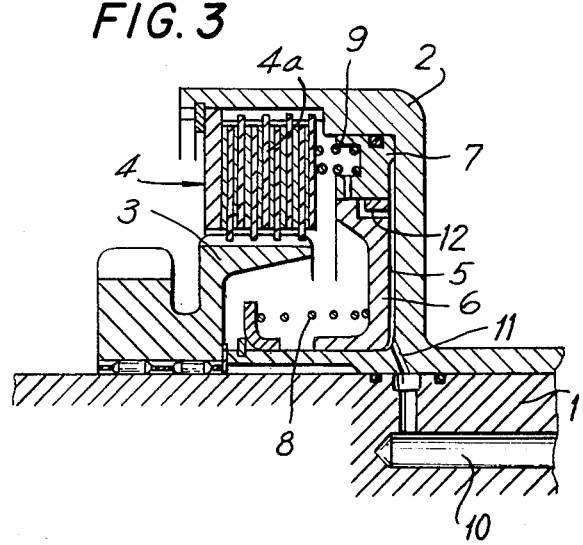
FIGS. 3 and 4 are sectional side views of modified embodiments.

In the illustrated embodiment of FIG. 3, the passageway 12 is formed in the inner piston 6 acted on by the weak return spring 8, so that the passageway is opened to the atmosphere during the advance of piston 6 with respect to piston 7.

Figure 4:
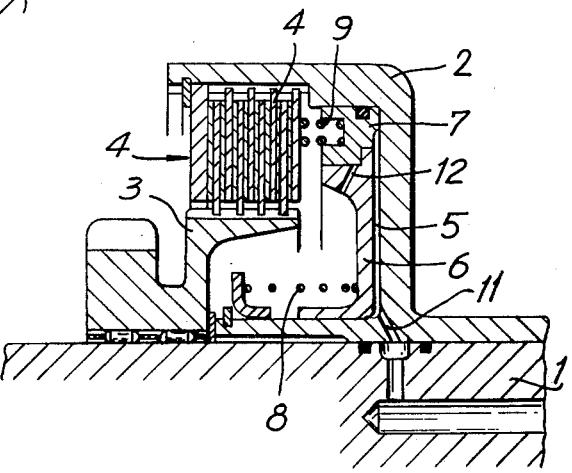

In the illustrated embodiment of FIG. 4, the return spring 8 acting on the inner piston 6 is constructed to be stronger than the return spring 9 acting on the outer piston 7 and the escape opening 12 is formed in the inner piston 6. The operation thereof is substantially the same as that of the apparatus shown in FIGS. 1 and 2.

It will be easily understood that substantially the same result can be obtained if the two divided pistons 6 and 7 are differentiated one from another in their respective pressure receiving areas, instead of in the strengths of the spring forces of their respective return springs 8 and 9.

Thus, according to this invention, a piston operable within a pressure chamber is divided into two piston portions, and at the time of liquid pressure supply, one piston portion is forced to advance to open an escape opening for discharging part of the pressure fluid to the atmosphere to effect a slow pressure rise within the pressure chamber, so that the increase of the force against the friction plates is at a comparatively low rate and is effective in softening the shock. The escape opening is then closed automatically, so that a strong force is obtained to complete the operation.

What is claimed is:

1. A friction clutch comprising a plurality of frictional clutch plates adapted for being pressed together in an operative position and released in an inoperative position, a piston including first and second relatively displaceable members, a first spring means coupling the clutch plates and the first said displaceable member, means defining a chamber adjacent said piston and into which pressure fluid can be introduced to produce a rise in pressure in said chamber to displace said piston, means providing for advance displacement of the second member of the piston relative to the first member thereof by the pressure of the fluid in the chamber, said second member of the piston being provided with a passageway which is positioned to provide a discharge path for pressure fluid from said chamber after said second member has undergone a given magnitude of relative displacement after initiation of supply of pressure fluid to said chamber, said passageway being initially blocked by said first member of the piston whereby the full pressure of said pressure fluid is initially applied to the piston, the rate of increase of said pressure in the chamber then diminishing upon opening of the passageway after said second member has undergone said given magnitude of relative displacement, and a second spring means acting on the second displaceable member to resist displacement thereof and having a strength different from that of the first spring means to cause the second displaceable member to contact the clutch plates in the advance displacement thereof for reversing the inequality of displacement of the first and second members after said discharge path has been established to cause the passageway to again become blocked and the discharge path closed so that the pressure in the chamber rises abruptly to the full pressure of said pressure fluid and the clutch plates are forceably pressed together by both the first and second members.

2. A clutch as claimed in claim 1, wherein said first spring means is stronger than the second spring means, the passageway in said second displaceable member being open into said chamber, said first displaceable member initially blocking the outlet of said passageway in the second displaceable member when the chamber is empty and the clutch plates inoperative.

3. A clutch as claimed in claim 2, wherein said first displaceable member has a bore leading to atmosphere and which comes into registry with said passageway upon advance displacement of said second displaceable member.

* * * * *

UNITED STATES PATENT OFFICE
CERTIFICATE OF CORRECTION

Patent No. 3,690,429    Dated  September 12, 1972

Inventor(s)  Soichiro Honda

It is certified that error appears in the above-identified patent and that said Letters Patent are hereby corrected as shown below:

On the cover sheet, insert -- [30] Foreign Application Priority Data  May 16, 1968    Japan........32521/68 -- .

Signed and sealed this 2nd day of January 1973.

(SEAL)
Attest:

EDWARD M. FLETCHER, JR.        ROBERT GOTTSCHALK
Attesting Officer              Commissioner of Patents